Aug. 5, 1958  A. RIMOLDINI  2,845,754
APPARATUS FOR SHAPING THE TIPS OF MACHINE TOOLS
Filed April 28, 1953  3 Sheets-Sheet 1

INVENTOR.
Andrea Rimoldini
BY Michael S. Striker

INVENTOR.
Andrea Rimoldini
BY Michael S. Striker
agt.

Aug. 5, 1958 A. RIMOLDINI 2,845,754
APPARATUS FOR SHAPING THE TIPS OF MACHINE TOOLS
Filed April 28, 1953 3 Sheets-Sheet 3

INVENTOR.
Andrea Rimoldini
BY Michael S. Striker
agt.

United States Patent Office 2,845,754
Patented Aug. 5, 1958

2,845,754
APPARATUS FOR SHAPING THE TIPS OF MACHINE TOOLS

Andrea Rimoldini, Bergamo, Italy, assignor to Dalmine S. p. A., Milan, Italy

Application April 28, 1953, Serial No. 351,625

Claims priority, application Italy January 29, 1953

14 Claims. (Cl. 51—73)

The present invention has as an object an apparatus for shaping carbide tipped tools.

Till now, to shape Widia tipped tools, for instance threading tools, recourse was had to a device comprising diamond grinding wheels whose motion was controlled by means of an optical projector with enlargement of the surfaces in contact and pantographic transmission of the movements. While this working process is very costly on account of the purchase of the relatively complicated apparatus and of the substitution of the grinding wheels with diamond grit, it is also not very exact as results, inasmuch as, excepting the rectilinear portions, the grinding wheel control is effected by hand, and therefore, the optical system amplification notwithstanding, the obtainable precision is relatively scarce and the finished parts shown incisions corresponding to very slight discontinuities of the wheel motion. Such a defect is particularly conspicuous in the places where rectilinear profiles blend into curvilinear ones.

It is further evident that with the working system above cited the presence of specialized hands is continuously necessary, and production is very limited. Further, if the grinding wheel speed is increased, or as soon as the edges of the diamond grains have become dull and the wheel has lost a part of its biting, the tips heat up under the work and microscopic cracks are produced, which comprise their efficiency both as concerns the exactness of the work and its durability.

It is, further, evident that with the above indicated working system the work of specialized personnel is necessary at all times and the production is limited. Moreover, if the working speed of the wheel is increased, or as soon as the edges of the diamond grains have dulled and the wheel has lost a part of its biting, the tips get heated and microscopic cracks are produced in them, which jeopardize both their efficiency as to precision and their lasting.

On the contrary, with the apparatus according to the invention the work is done with simpler, cheaper, resistant and practically everlasting means; a multiple, automatic operation is had, that can be entrusted to non-specialized hands with a consequent increase in production and a noticeable betterment of the results, as tools are obtained having a perfectly regular and continuous surface.

The invention consists in the preparation of a die having at least one groove whose normal section is a negative reproduction of the shape to be given to the tip, in the application upon the surface of said groove of an abrasive powder having a hardness not less than that of the material constituting the tip, held in suspension in a liquid, in causing the portion of the tip to be shaped or ground to slide (continuously, intermittently or reciprocatingly) under pressure against the groove wall, with the interposition of the abrasive in suspension.

As liquids various substances can be used (for instance water, mineral oil, paraffin oil, etc.) though experience has demonstrated that olive oil is to be preferred, on account of its viscosity characteristics.

As abrasives the various natural or artificial substances known in the technique can be used, having a hardness at least equal to the one of the material constituting the tip to be worked (as, for instance, boron or silicium carbides, diamond or corundum powder, aluminium oxide). It is also possible to employ different abrasives at the same time.

The advantage of employing a mechanical apparatus for producing the sliding between the surface to be worked and the die for a time as long as necessary and under constant conditions is evident.

Although the groove may have widely different forms, in order to simplify both the operations necessary for cutting the groove in the die, and the driving of the sliding motion between tool and groove, it is expedient to give the preference to rectilinear, circular or helicoidal developments.

The first one requires the employment in the driving organ of a direction reversing means to realize reciprocating movements; if, on the contrary, a circular groove is made use of, a continuous movement of an unlimited duration is possible; in the case of the helicoidal groove the reversing of the movement would still be necessary, excepting the possibility of arranging in the external or internal wall of a drum a number of helicoidal turns sufficient to accomplish the required shaping work, the tool carriers having to be reutrned to the initial position only for the commencement of another operation.

For greater clarity there will hereunder be described an apparatus working by circular motion and multiple operation, both because several tools are contemporaneously shaped and because the same die carries several grooves (in a greater number than the number of the tools) that can be utilized one after the other. By using abrasives possessing different characteristics (or different grades of fineness) it is possible to realize different roughing and finishing cuts.

The hard metal tips shaped by the apparatus according to the invention have a continuous, crackless surface and have a degree of precision unknown till now.

For greater clarity reference is made to the following drawings in which the apparatus according to the invention is represented in a preferred form of embodiment, given only as an example.

Fig. 1 schematically represents a bar provided with Widia tips under working,

Figure 1:
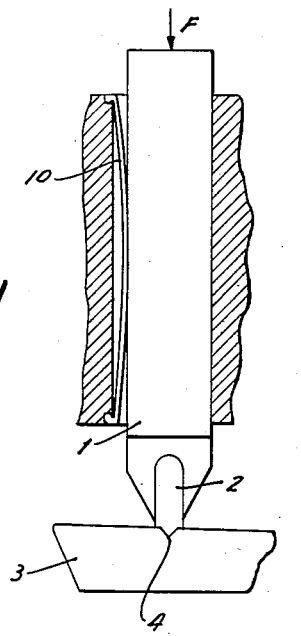

Referring to the drawing, the tool in question is constituted by a stem 1 carrying at one end a tip 2 fixed in a known way, by brazing, for instance, which tip has a work surface approximately shaped in relation with the work for which the tip is intended for, and that is to be precision finished.

In a body 3 that will be called the die, grooves 4 have been cut, whose shape reproduces as a positive the shape that is to be given the piece to be worked, and corresponds as a negative to the shape of the hard metal tool that is to be precision finished.

Figure 3:
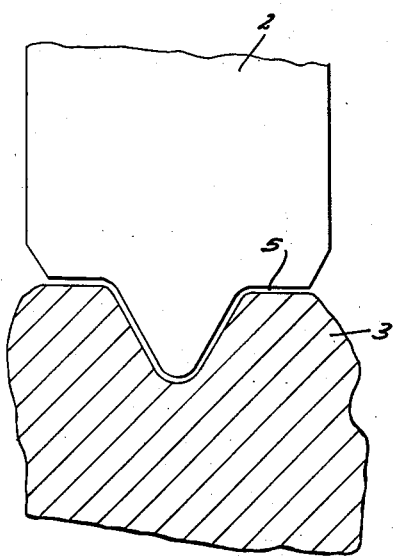
Fig. 3 is a particular of Fig. 1 on an enlarged scale.

In Fig. 1 it has been supposed that the grooves have a triangular shape, whereas in the case of Fig. 3 (on an enlarged scale) it has been supposed that it is required that the shape of a thread rounded off at the top and base is to be realized.

The space comprised between the facing surfaces of the die 3 and of the tip 2, is filled by finely powdered abrasive held in suspension in a suitable liquid.

Figure 4:
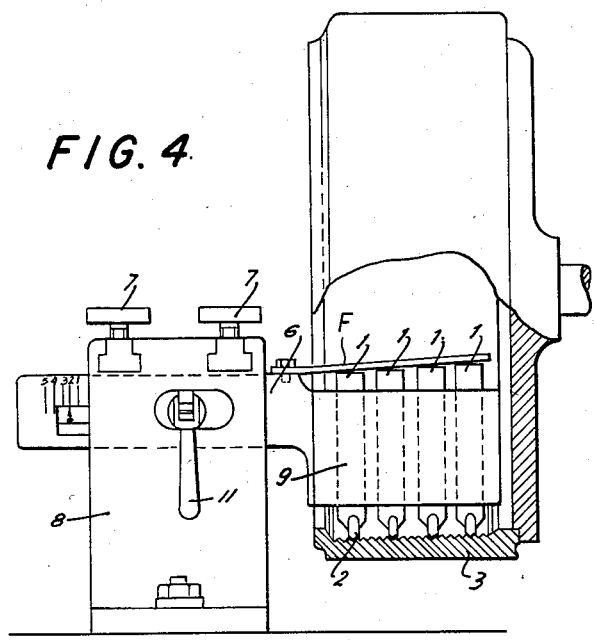
Fig. 4 represents under a schematic form a machine for carrying out the process.
Figure 5:
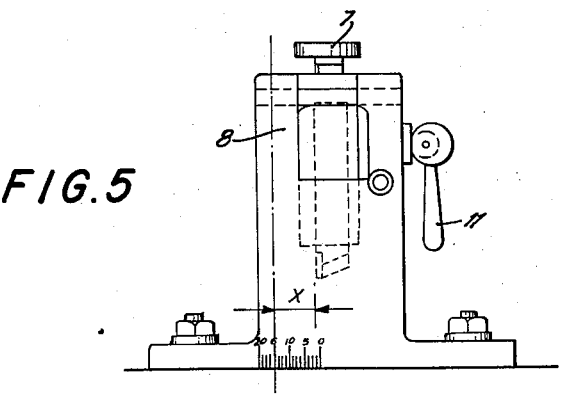
Fig. 5 is a side view of the tool carrier of said machine.

The means for realizing the motion between tool and die are represented, in a preferred form of embodiment, in Figs. 4 and 5.

Figure 2:
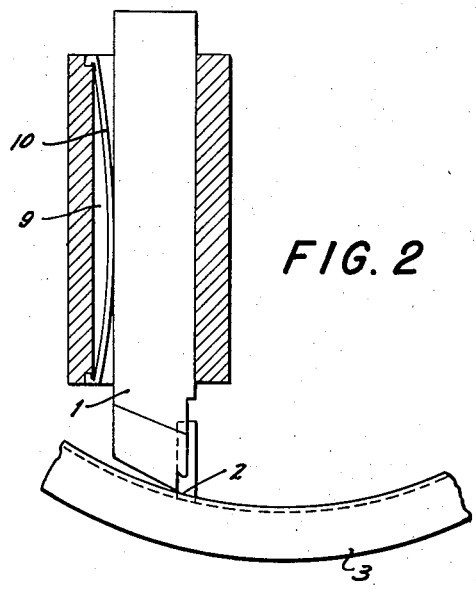
Fig. 2 represents the same in a side view.

A strong bar 6 carrying the tools is locked by means of screws 7 in the body of a support 8 and provided with holes 9 into which are introduced stems 1, preferably loaded by a force F (for instance, a weight or a spring) and kept in place by two flat springs indicated by 10 (Figs. 1 and 2).

In this case the die is constituted by a ring carrying grooves 4. Ring 3 is caused to revolve around its axis by means not represented and thereby obliges the point of tip 2 to slide along the channel corresponding to groove 4.

Preferably, bar 6 is provided with several holes (for instance 4 as in the figure) in each of them the stem of a tool being fixed, and the die 3 is provided with a relatively great number of grooves, greater than the number of tips that are working contemporaneously, and in this way when the grooves after a long period of work have altered, it is possible to shift bar 6 in a direction parallel to the axis of die 3, for instance by means of lever 11 (Figs. 4 and 5) which causes bar 6 to advance a certain number of notches whose distance corresponds to a multiple of the distance between the successive grooves 4.

Figure 6:
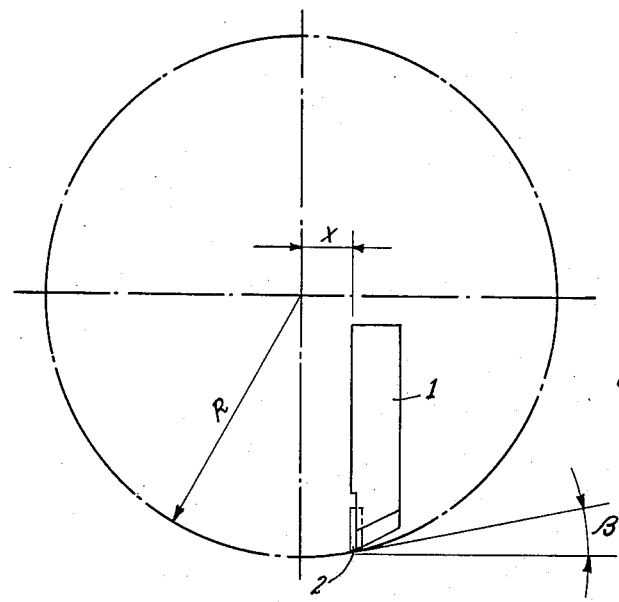
Fig. 6 is a working scheme of tips for the precision finishing of threads.
Figure 7:
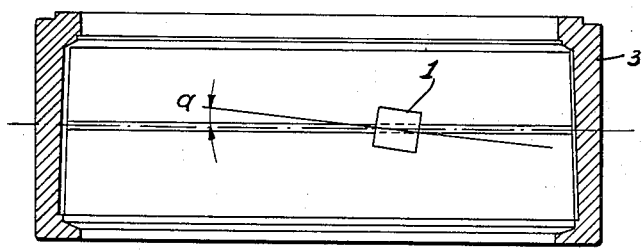
Fig. 7 is a horizontal section of a die corresponding to the scheme of Fig. 4.
Figure 8:
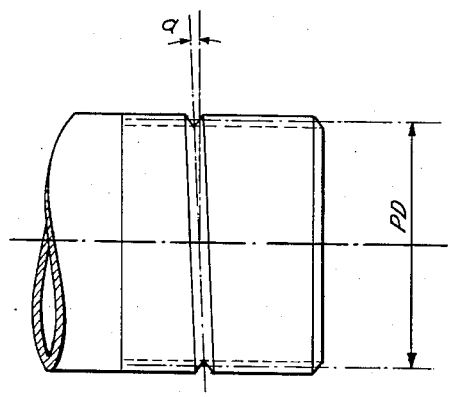
Fig. 8 represents the cylindrical piece being worked with said tips.

Lastly, Figs. 6, 7 and 8 show how it is possible, by an apparatus corresponding to Figs. 4 and 5, to precision finish a tool suitable for finishing threads with a given pitch diameter PD and therefore provided with cutting edges having a suitable inclination angle $\alpha$ and a suitable rake angle $\beta$.

For greater clarity in Figs. 7 and 8 the inclination $\alpha$ has been exaggerated to make it more visible.

As Fig. 7 shows, the shet of the tool (and consequently the axis of the tip) is inclined at an angle $\alpha$ in respect to the groove plane; at the same time the point of the tip is not placed in the center line plane of the die, but is retroceded by a distance X (equal to R sin $\beta$) in order to create rake angle $\beta$ (see Fig. 6).

It is evident that the apparatus according to the invention can also serve to precision finish single (i. e. not stem mounted) tips by simply holding them by suitable means in the right location with respect to the groove.

Although reference has been made to tipped tools for finishing threads, the same apparatus can serve also for tipped tools intended for various mechanical operations on the lathe, the plane etc. both on metallic materials and other types of materials (for instance, operations on buttons, etc.).

The apparatus described can also serve for precision finishing tools constituted by carbon tool steel, by special steel, by high speed steel and the like.

I claim:

1. Apparatus for shaping the tip of a tool member comprising, in combination, a die member having elongated shaping faces with a cross-section equal to the desired cross-section of said tip and being harder than said tip; an abrasive compound having a hardness at least equal to the hardness of said tool tip and being applied to said shaping faces; a mounting member being formed with at least one passageway adapted to receive the tool tip therein; a leaf spring for slidably mounting the tool tip in said passageway; means for urging said tool tip against said shaping faces of said die member and holding it pressed against said shaping faces in desired position relative thereto; and means for moving said die member in the direction of said elongated shaping faces while said tool tip is held pressed against said shaping faces, whereby said abrasive compound shapes said tool tip to mate with the shape of said shaping faces.

2. Apparatus as claimed in claim 1 wherein said abrasive compound is held in suspension in a liquid.

3. Apparatus as claimed in claim 1 wherein said abrasive compound is a carbide.

4. Apparatus for simultaneously shaping the tips of a plurality of tool members comprising, in combination, a plurality of die members having elongated shaping faces with cross-sections equal to the desired cross-sections of said tips; a mounting member being formed with a plurality of passageways, each of which is adapted to receive one of the tool tips therein, respectively; a plurality of leaf springs, each of said leaf springs being mounted respectively in one of said passageways for slidably mounting its respective tool tip; a common leaf spring for urging said tool tips against said shaping faces of said die members and holding them pressed against said shaping faces in desired position relative thereto; and means for moving at least one of said members in the direction of said elongated shaping faces while said tool tip is held pressed against said shaping faces.

5. Apparatus for simultaneously shaping the tips of a plurality of tool members comprising, in combination, a plurality of die members having elongated shaping faces with cross-sections equal to the desired cross-sections of said tips; an abrasive compound having a hardness at least equal to the hardness of said tool tips and being applied to said shaping faces; a mounting member being formed with a plurality of passageways, each of which is adapted to receive one of the tool tips therein, respectively; a plurality of leaf springs, each of said leaf springs being mounted respectively in one of said passageways for slidably mounting its respective tool tip; a common leaf spring for urging said tool tips against said shaping faces of said die members and holding them pressed against said shaping faces in desired position relative thereto; and means for moving at least one of said members in the direction of said elongated shaping faces while said tool tip is held pressed against said shaping faces, whereby said abrasive compound shapes said tool tips to make with the shape of said shaping faces.

6. Apparatus for simultaneously shaping the tips of a plurality of tool members comprising, in combination, a plurality of die members having elongated shaping faces harder than said tips, respectively, with cross-sections equal to the desired cross-sections of said tips; an abrasive compound having a hardness at least equal to the hardness of said tool tips and being applied to said shaping faces; a mounting member including a common leaf spring for urging said tool tips against said shaping faces of said die members and holding them pressed against said shaping faces in desired position relative thereto, said mounting member being formed with a plurality of passageways each adapted to receive one of said tool members therein, respectively; in each passageway a leaf spring for slidably mounting a tool tip therein; and means for moving said plurality of die members in the direction of said elongated shaping faces while said tool tips are held pressed against said shaping faces, whereby said abrasive compound shapes said tool tips to make with the shape of said shaping faces.

7. Apparatus for shaping the tips of a plurality of tool members comprising, in combination, a cylindrical, rotatably mounted member having a plurality of internal annular dies formed in the inner surface thereof, said dies having elongated shaping faces harder than said tips, respectively, with cross-sections equal to the desired cross-sections of said tip and having annular lip portions adjacent the outermost shaping faces thereof extending radially inward with respect to said faces; an abrasive compound having a hardness at least equal to the hardness of said tool tips and being applied to said shaping faces; a mounting member including means for urging said tool tips against said shaping faces of said die members and holding them pressed against said shaping faces in desired position relative thereto, said mounting member being formed with a plurality of passageways each adapted to receive one of said tool members therein, respectively; in each passageway a leaf spring for slidably mounting a tool tip therein; and means for rotating said cylindrical member while said tool tips are held pressed against said shaping faces whereby said abrasive compound shapes said tool tips to mate with the shape of said shaping faces.

8. Apparatus for shaping the tips of a plurality of tool members comprising, in combination, a cylindrical, rotatably mounted member; a plurality of internal annular dies formed in the inner surface of said cylindrical member, the number of said die members being larger than the number of said plurality of tool members, said dies having elongated shaping faces harder than said tips, respectively, with cross-sections equal to the desired cross-sections of said tips; an abrasive compound having a hardness at least equal to the hardness of said tool tips and being applied to said shaping faces; a mounting member including means for urging said tool tips against said shaping faces of said die members and holding them pressed against said shaping faces in desired position relative thereto, said mounting member being reciprocably movable in a direction parallel to the axis of said cylindrical member, said mounting member being formed with a plurality of passageways each adapted to receive one of said tool members therein, respectively; in each passageway a leaf spring for slidably mounting a tool tip therein; and means for rotating said cylindrical member while said tool tips are held pressed against said shaping faces whereby said abrasive compound shapes said tool tips to mate with the shape of said shaping faces.

9. Apparatus as claimed in claim 8 wherein said urging and holding means holds said tool tips separated at distances equal to an integral multiple of the distance between adjacent annular die members whereby said tool tips may be simultaneously moved to mate with different shaping faces when desired.

10. Apparatus as claimed in claim 8 wherein adjacent die members are provided with abrasive compounds having different grinding characteristics.

11. Apparatus for shaping the tips of a plurality of tool members comprising, in combination, a substantially horizontal, cylindrical, rotatably mounted member having a plurality of internal annular dies formed in the inner surface thereof, said dies having elongated shaping faces harder than said tips, respectively, with cross-sections equal to the desired cross-sections of said tips and having annular lip portions adjacent the outermost shaping faces thereof extending radially inward with respect to said faces; an abrasive compound suspended in a liquid disposed on said shaping faces between the lip portions thereof, said abrasive compound having a hardness at least equal to the hardness of said tool tips; a mounting member including means for urging the tool tips against said shaping faces of said die members and holding them pressed against said shaping faces in desired position relative thereto, said mounting member being formed with a plurality of passageways each adapted to receive one of said tool members therein, respectively; in each passageway a leaf spring for slidably mounting a tool tip therein; and means for rotating said cylindrical member while said tool tips are held pressed against said shaping faces whereby said abrasive compound shapes said tool tips to mate with the shape of said shaping faces.

12. Apparatus for shaping the tips of a plurality of tool members, comprising, in combination, a cylindrical rotatably mounted member having a plurality of internal annular dies formed in the inner surface thereof, said dies having elongated shaping faces harder than said tips, respectively, with cross-sections equal to the desired cross-sections of said tips; an abrasive compound having a hardness at least equal to the hardness of said tool tips and being applied to said shaping faces; a mounting member including means for urging said tool tips against said shaping faces of said die members and for holding them pressed against said shaping faces in desired positions relative thereto, said mounting member being formed with a plurality of passageways each adapted to receive one of said tool members therein, respectively, said mounting member further being adjustable in a direction perpendicular to the axis of said cylindrical member and to the front face of said tool member for controlling the rake angle of said tool tips in accordance with the thus adjusted distance between said axis and said front face measured in said direction; in each passageway a leaf spring for slidably mounting a tool tip therein; and means for rotating said cylindrical member while said tool tips are held pressed against said shaping faces whereby said abrasive compound shapes said tool tips to mate with the shape of said shaping faces.

13. An apparatus as set forth in claim 12 wherein said mounting member is formed to hold said tool members turned at an angle about the lengthwise direction of said passageways for obtaining a shape of the tool tip unsymmetrical with respect to the front face of the tool tip.

14. Apparatus for shaping the tips of a plurality of tool members, comprising, in combination, a cylindrical rotatably mounted member having a plurality of internal annular dies formed in the inner surface thereof, said dies having elongated shaping faces harder than said tips, respectively with cross-sections equal to the desired cross-sections of said tips; an abrasive compound having a hardness at least equal to the hardness of said tool tips and being applied to said shaping faces; a mounting member including means for urging said tool tips against said shaping faces of said die members and for holding them pressed against said shaping faces in desired positions relative thereto, said mounting member being formed with a plurality of passageways each adapted to receive one of said tool members therein, respectively, said mounting member being formed to hold said tool members turned at an angle about the lengthwise direction of said passageways for obtaining a shape of the tool tip unsymmetrical with respect to the front face of the tool tip; in each passageway a leaf spring for slidably mounting a tool tip therein; and means for rotating said cylindrical member while said tool tips are held pressed against said shaping faces whereby said abrasive compound shapes said tool tips to mate with the shape of said shaping faces.

References Cited in the file of this patent

UNITED STATES PATENTS

| | | |
|---|---|---|
| 415,926 | Schoncke | Nov. 26, 1889 |
| 438,581 | Hastings | Oct. 14, 1890 |
| 981,417 | Halsey et al. | Jan. 10, 1911 |
| 1,307,577 | Chapman | June 24, 1919 |
| 1,360,435 | Olson | Nov. 30, 1920 |
| 1,660,811 | Perkins | Feb. 28, 1928 |
| 1,843,549 | Firth | Feb. 2, 1932 |

FOREIGN PATENTS

| | | |
|---|---|---|
| 625,105 | Great Britain | June 22, 1949 |

OTHER REFERENCES

Article: "The Lapping of Tungsten-Carbide Tools," pages 718 and 719 of "Machinery," May 1930. (Copy in Div. 58.)